United States Patent
Lee et al.

(10) Patent No.: US 7,860,238 B2
(45) Date of Patent: Dec. 28, 2010

(54) COMMUNICATION TERMINAL AND ADDITIONAL FUNCTION MODULE THEREOF

(75) Inventors: Seok-Jin Lee, Daejeon (KR); Seung-Kwon Cho, Guri (KR); Young-Il Kim, Daejeon (KR)

(73) Assignees: Samsung Electronics Co., Ltd. (KR); Electronics and Telecommunications Research Institute (KR); KT Corporation (KR); SK Telecom Co., Ltd. (KR); Hanaro Telecom., Inc (KR)

( * ) Notice: Subject to any disclaimer, the term of this patent is extended or adjusted under 35 U.S.C. 154(b) by 1051 days.

(21) Appl. No.: 11/636,765

(22) Filed: Dec. 11, 2006

(65) Prior Publication Data
US 2007/0135177 A1    Jun. 14, 2007

(30) Foreign Application Priority Data
Dec. 10, 2005  (KR) ..................... 10-2005-0121334

(51) Int. Cl.
  *H04M 1/00*  (2006.01)
  *H04M 9/00*  (2006.01)
(52) U.S. Cl. .................. 379/433.09; 455/557
(58) Field of Classification Search ............... 379/419, 379/433.09; 455/557
See application file for complete search history.

(56) References Cited

U.S. PATENT DOCUMENTS

| 5,436,969 A | * | 7/1995 | Kobayashi | ............. 379/433.09 |
| 5,487,099 A | * | 1/1996 | Maekawa | ................ 455/556.1 |
| 5,669,069 A | * | 9/1997 | Rautila | ........................ 455/558 |
| 7,409,225 B2 | * | 8/2008 | Kim et al. | .................... 455/558 |

FOREIGN PATENT DOCUMENTS

| KR | 1020000056396 | 9/2000 |
| KR | 1020020090596 | 12/2002 |
| KR | 1020040049225 | 6/2004 |
| WO | WO 2004/038943 | 5/2004 |

* cited by examiner

*Primary Examiner*—Hemant Patel
*Assistant Examiner*—Phylesha Dabney
(74) *Attorney, Agent, or Firm*—The Farrell Law Firm, LLP

(57) ABSTRACT

A terminal main body of a communication terminal is supplied power from a battery pack through a DC signal path. The terminal main body communicates with at least one additional function module providing an additional function through a communication path connected to the DC signal path so as to provide the additional function to a user. Herein, the communication path is an AC signal path. That is, a signal transmitted/received between the terminal main body and the additional function module is an AC signal, and thus, the communication path can be compatible with the DC signal path providing the power. In addition, a plurality of additional function modules can be serially connected in the form of a serial communication bus, and therefore, a user can select a plurality of additional functions.

10 Claims, 2 Drawing Sheets

COMMUNICATION TERMINAL AND ADDITIONAL FUNCTION MODULE THEREOF

PRIORITY

This application claims priority to Korean Patent Application No. 10-2005-0121334 filed in the Korean Intellectual Property Office on Dec. 10, 2005, the contents of which are incorporated herein by reference.

BACKGROUND OF THE INVENTION

1. Field of the Invention

The present invention relates to a portable mobile communication terminal, and in particular to a communication terminal and an additional function module thereof.

2. Description of the Related Art

Recently, since a communication terminal, particularly, a portable mobile communication terminal is manufactured in a small size, it is difficult to add application hardware after a complete communication terminal is released to the market. Although a contact port may be provided in the communication terminal for connecting a small-sized memory card or an authentication/encryption card thereto, there is a spatial limit due to the small size of the communication terminal.

Such a characteristic of the communication terminal makes it difficult to connect an additional apparatus to the communication terminal when a user wants to add application hardware for a desired purpose. For example, the communication terminal must be connected with an external device through a wired port (e.g., a cable) or a wireless port (e.g., Bluetooth or IF port).

According to PCT publication No. WO2004/038943 A1, a battery module providing direct current power to a communication terminal through a power supply terminal has a specific application function installed therein. In addition, the communication terminal provides additional functions in a battery packet while communicating with the battery module through a communication unit. Although there may not be a need to purchase a new communication terminal in order to add a new function to the communication terminal unit, a user is required to continuously purchase battery modules in which a new application function is installed and must continuously replace the battery module whenever the user wants a different application function. That is, one battery module cannot provide a plurality of additional functions.

SUMMARY OF THE INVENTION

The present invention has been made in an effort to provide a communication terminal having advantages of providing a plurality of additional functions.

A communication terminal includes a battery pack, a terminal main body, and at least one additional function module. The battery pack includes a battery cell for supplying power through a direct current (DC) signal path. The terminal main body is driven by the power supplied from the battery cell, and provides at least one additional function to a user. The at least one additional function module is electrically connected between the battery pack and the terminal main body, and provides the at least one additional function to the terminal main body through a communication path.

A additional function module according to another embodiment of the present invention is configured to be provided between a battery pack supplying power through a DC signal path and a terminal main body driven by the power supplied from the battery cell, and provides an additional function to a user.

The additional function module includes a communication path and an additional function processor. The communication path is configured to be electrically connected between the battery pack and the terminal main body. The addition function processor provides the additional function to the terminal main body through the communication path.

BRIEF DESCRIPTION OF THE DRAWINGS

The above and other objects, features and advantages of the present invention will be more readily apparent from the following detailed description, taken in conjunction with the accompanying drawings, in which.

DETAILED DESCRIPTION OF THE EMBODIMENTS

Figure 1:
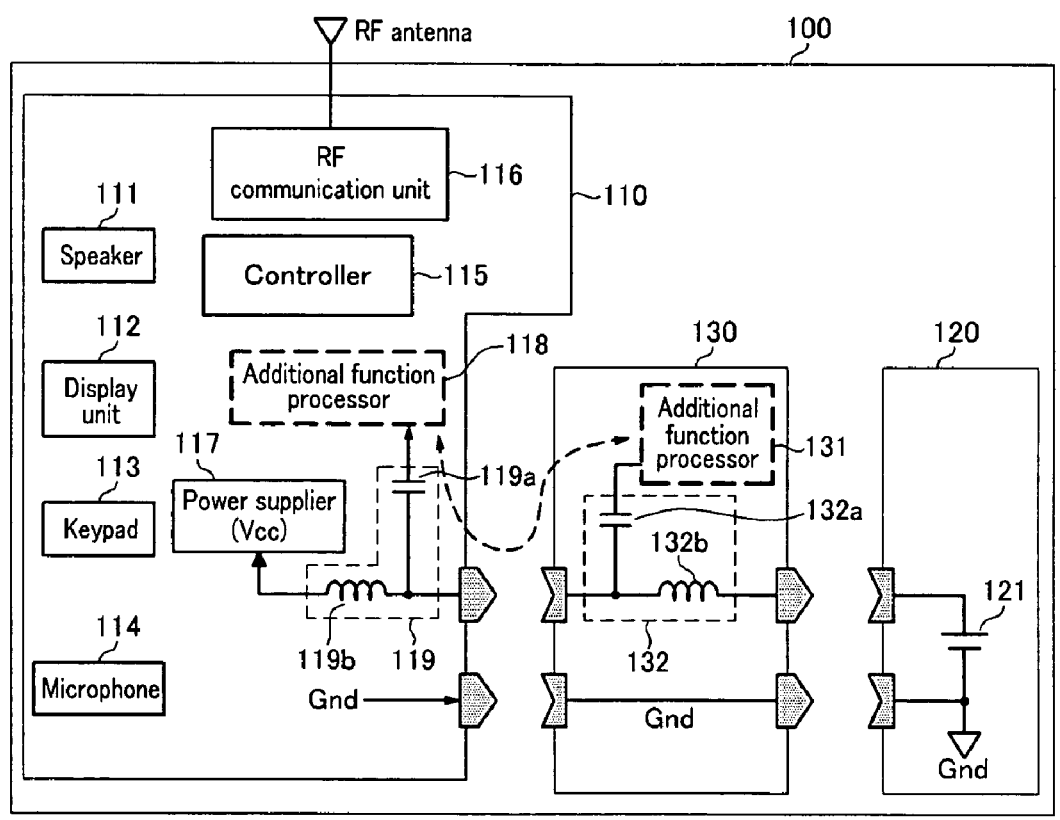
FIG. 1 shows a communication terminal according to a first embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

A communication terminal according to the present invention will be described in more detail with reference to the accompanying drawings.

FIG. 1 schematically shows a communication terminal according to a first embodiment of the present invention.

As shown in FIG. 1, a communication terminal 100 includes a terminal main body 110, a battery pack 120, and an additional function module 130.

The terminal main body 110 includes a speaker 111, a display unit 112, a keypad 113, a microphone 114, a controller 115, a radio frequency (RF) communication unit 116, a power supplier 117, an additional function processor 118, and a path separator 119. Herein, elements of the terminal main body 110, with the exception of the controller 115, the additional function unit 118, and the path separator 119, are well known to a person of ordinary skill in the art, and therefore, further descriptions related thereto will be omitted.

Based on a request of a user, the controller 115 performs a control function for providing the user with a default function which has been implemented in the communication terminal 100 when the communication terminal 100 is manufactured. In addition, the controller 115 controls the additional function module 130 through the additional function processor 118 to provide additional functions that cannot be provided by the communication terminal 100, to a user.

The additional function processor 118 communicates with an additional function processor 131 of the additional function module 130 through a communication path, which is separated from a direct current (DC)-signal path, the DC-signal path delivering DC power supplied from a battery cell 121 to the power supplier 117. In addition, the additional function processor 118 receives the additional functions from the additional function processor 131 of the additional function module 130 and provides the received additional functions to the user under the control of controller 115.

The path separator 119 includes blocking units 119a and 119b. The blocking unit 119a is connected to the communication path separated from the DC-signal path and blocks inflow of direct current to the additional function processor 118. In addition, the blocking unit 119b blocks transmission of a signal output from the additional function processors 118 and 131 into the power supplier 117.

The battery pack 120 includes the battery cell 121 that supplies DC power to the terminal main body 110 through the DC-signal path. The DC power is passed through the additional function module 130 through the DC-signal path and then delivered to the terminal main body 110.

The additional function module 130 includes the additional function processor 131 and a path separator 132. The additional function processor 131 processes a signal delivered from the terminal main body 110 through the communication path, and transmits the processed signal to the additional function processor 118 in the terminal main body 110.

Similar to the path separator 119, the path separator 132 includes blocking units 132a and 132b. The blocking unit 132a is connected to the communication path separated from the DC-signal path and blocks inflow of the DC power to the additional function processor 131. The blocking unit 132b blocks transmission of a signal output from the additional function processors 118 and 122 into the battery cell 121.

Herein, a communication path between the additional function processor 118 of the terminal main body 110 and the additional function processor 131 of the additional function module 130 utilizes the DC-signal path. In further detail, an alternate current (AC)-signal path separated from the DC-signal path by using an AC-coupling method is provided. In order to use the AC-signal path, the additional function processor 118 of the terminal main body 110 and the additional function processor 131 of the additional function module 130 respectively include a modulation and demodulation function. Herein, the modulation function can be given as Equation (1).

$$e = A \sin(2\pi f_c + C) \quad (1)$$

That is, amplitude modulation can be performed based on a variation of A and frequency modulation or phase modulation can be performed based on a variation of C. Accordingly, a modulated signal e can pass through the AC-signal path since it has a carrier frequency corresponding to $f_c$. In addition, the additional function processor 118 of the terminal main body 110 and the additional function processor 131 of the additional function module 130 can respectively transmit and receive data at the same time through the AC-signal path by using the modulation method of Equation (1). That is, the AC-signal path becomes a full-duplex communication path.

The blocking units 119a and 132a of the communication terminal 100 prevent inflow of the DC power, and both can be provided as a capacitive element (e.g., a capacitor). In addition, the blocking units 119b and 132b prevent a signal (i.e. an AC signal) output from the additional function processors 118 and 131 from being transmitted to the battery cell 121 or to the power supplier 117, and can be provided as an inductive element (e.g., an inductor) that blocks an AC signal.

The terminal main body 110, the additional function module 130, and the battery pack 120 are combined by a combination terminal block, the additional function processor 118 of the terminal main body 110 communicates with the additional function processor 131 of the additional function module 130 through the AC-signal path separated from the DC-signal path, and the terminal main body 110 and the battery module 120 interact with each other through the DC-signal path.

The additional function module 130 provides additional functions which are not implemented in the communication terminal 100, such as a camera function and an MP3 function. Herein, when an additional function module 130 is developed for a new additional function, software in the additional function processor 118 of the terminal main body 110 that communicates with the new additional function module needs to be upgraded or installed to the additional function processor 118.

For example, a computer and the communication terminal 100 are connected through a cable, and the corresponding software in the additional function processor 118 can be upgraded or installed. A means for upgrading software is well known to a person of ordinary skill in the art, and therefore, a further description related thereto will be omitted. In addition, the additional function module 130 may separately include a power supplier (not shown) for supplying DC power to the additional function processor 131, wherein the DC power is supplied from the battery cell 121 through the DC-signal path.

An operation of the communication terminal 100 of FIG. 1 will be described in more detail. Assume that the communication terminal 100 does not support a MP3 function and the additional function module 130 supports the MP3 function.

When the communication terminal 100 provides an additional function menu to a user through the display unit 112, the user can select the MP3 function by using the keypad 113. When the user selects one of command functions (e.g., a sound source file list transmission, sound resource file play, or sound source file delete), the controller 115 transmits a signal corresponding to the selected function to the additional function processor 118.

The additional function processor 118 modulates the signal and transmits the modulated signal to the additional function processor 131 through the AC-signal path separated from the DC-signal path. The additional function processor 131 demodulates the signal transmitted from the additional function processor 118, analyzes the demodulated signal, and processes the command selected by the user.

Then, the additional function processor 131 demodulates a response signal and transmits the demodulated response signal to the additional function processor 118. For example, when the user requests the sound source file list transmission, a signal for the sound source file list is modulated and transmitted to the additional function processor 118. The additional function processor 118 demodulates and analyzes the received signal and transmits the analysis result to the controller 115, and the controller 115 controls the speaker 111 and the display unit 112 based on the analysis result so as to provide the user-requested function.

Figure 2:
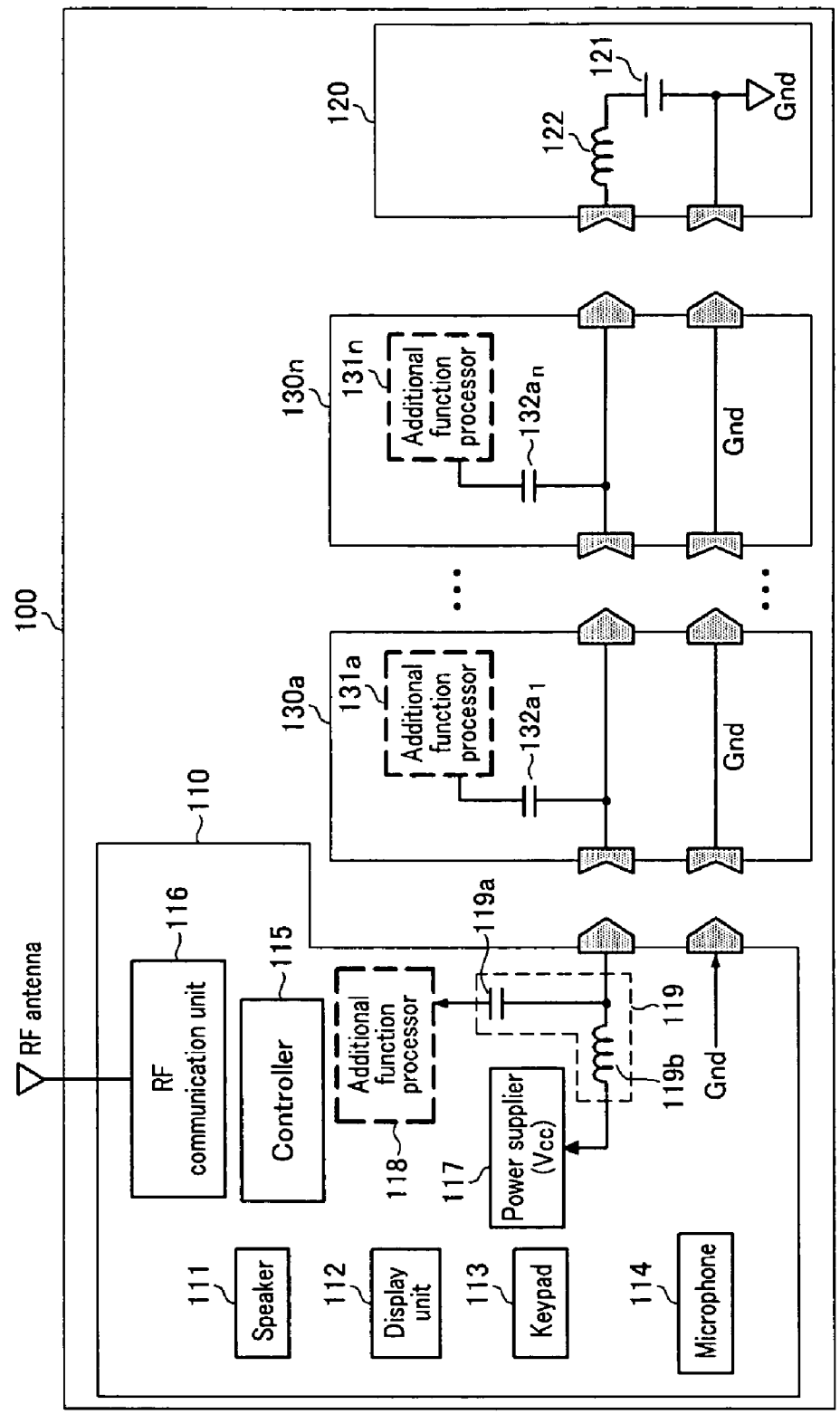
FIG. 2 shows a communication terminal according to a second embodiment of the present invention.

FIG. 2 schematically shows a communication terminal according to a second embodiment of the present invention.

As shown in FIG. 2, a communication terminal 100' is the same as the communication terminal 100 of the first embodiment, except that a plurality of additional function modules 130a to 130n are provided between a terminal main body 110 and a battery pack 120 of the communication terminal 100'.

When the plurality of additional function modules 130a to 130n are serially connected, blocking units may be provided to the respective additional function modules 130a to 130n so as to block transmission of a signal demodulated by the additional function processors 118 and 121 to the battery cell 121. However, since the blocking unit is provided as an inductive element (e.g., an inductor) blocking an AC signal, the blocking units of the respective additional function modules, excepting for the additional function module 130*a*, may not be able to communicate with an additional function processor 118 of a terminal main body 100 due to a blocking unit formed in the additional function module 130*a*.

Therefore, according to the second embodiment of the present invention, a blocking unit (not shown) that blocks an AC signal is provided in the last additional function module 130*n*, which is directly connected with a battery pack 120, or on a DC-signal path provided in the battery pack 120, as shown in FIG. 2. It is illustrated in FIG. 2 that a blocking unit 122 is provided on the DC-signal path in the battery pack 120.

An operational process of the communication terminal of FIG. 2 is almost similar to that of the communication terminal of FIG. 1. However, in the communication terminal of FIG. 2, when a user selects one of additional functions and selects one command of the selected additional function, the additional function processor 118 transmits a corresponding command signal to an additional function processor 131$_a$ to 131$_n$ of an additional function module 130$_a$ to 130$_n$ that provides the additional function selected by the user through an AC-signal path under the control of controller 115.

As described, a plurality of user-desired hardware components can be easily implemented in the communication terminal according to the exemplary embodiments of the present invention. Accordingly, an additional apparatus interacting with the communication terminal can be easily developed and a user-desired additional function can be provided to the user without replacing the communication terminal.

The above-described exemplary embodiments of the present invention may be realized by an apparatus and a method, but it may also be realized by a program that realizes functions corresponding to configurations of the exemplary embodiment or a recording medium that records the program. Such a realization can be easily performed by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A communication terminal comprising:
   a battery pack including a battery cell for supplying power through a direct current (DC) signal path;
   a terminal main body driven by the power supplied from the battery cell, and providing at least one additional function to a user; and
   at least one additional function module electrically connected between the battery pack and the terminal main body, providing the at least one additional function to the terminal main body through a communication path, and including a plurality of additional function modules that are connected in a serial communication bus format,
   wherein the terminal main body comprises:
   an additional function processor for demodulating a signal received from the at least one additional function module and modulating a signal for transmitting the signal to the at least one additional function module so as to provide the at least one additional function;
   a power supplier for receiving power from the battery cell through the DC signal path to drive the terminal main body;
   a first blocking unit located on the communication path, and blocking inflow of the power supplied from the battery cell to the additional function processor;
   a second blocking unit located on the communication path, and blocking inflow of the signal transmitted to and received from the at least one additional function module so as to provide the additional function to the power supplier; and
   a controller for controlling the additional function processor and the at least one additional function module,
   wherein the battery pack comprises a third blocking unit located on the communication path and blocking transmission of a signal transmitting/receiving to/from the terminal main body to the battery cell.

2. The communication terminal of claim 1, wherein the communication path is connected to the DC signal path.

3. The communication terminal of claim 1, wherein the at least one additional function module comprises:
   the additional function processor for demodulating a signal received from the terminal main body and modulating a signal for transmitting to the terminal main body so as to provide the at least one additional function; and
   a fourth blocking unit located on the communication path, and blocking inflow of the power supplied to the terminal main body from the battery cell into the additional function processor.

4. The communication terminal of claim 3, wherein the fourth blocking unit comprises a capacitor.

5. The communication terminal of claim 1, wherein an additional function module electrically adjacent to the battery pack among the plurality of additional function modules comprises a fourth blocking unit located on the communication path and blocking transmission of a signal transmitting/receiving to/from the terminal main body to the battery pack.

6. The communication terminal of claim 5, wherein the fourth blocking unit comprises an inductor.

7. The communication terminal of claim 1, wherein the communication path is an alternate current (AC) signal path.

8. The communication terminal of claim 1, wherein the additional function processor and the at least one additional function module perform full-duplex communication.

9. The communication terminal of claim 1, wherein the first blocking unit comprises a capacitor.

10. The communication terminal of claim 1, wherein the second blocking unit comprises an inductor.

* * * * *